Patented Aug. 21, 1945

2,383,398

UNITED STATES PATENT OFFICE 2,383,398

PROCESS FOR EXTRACTING OIL FROM AVOCADOS

Howard T. Love, Mayaguez, P. R.; dedicated to the free use of the People in the Territory of the United States No Drawing. Application October 9, 1943, Serial No. 505,700

4 Claims. (Cl. 260—412)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People in the Territory of the United States to take effect on the granting of a patent to me.

This invention relates to a process for extracting oil from avocados, which plant elements contain a large amount of oil and water in an emulsified condition contained within the cell cavities.

In present methods of extracting oil from avocados, the sliced or ground avocado meat is first dehydrated, usually in an atmosphere of inert gas, such as nitrogen or carbon dioxide. This involves an onerous procedure, since a large quantity of water must be removed, the fresh fruit containing 60 to 80 percent of water in the flesh or edible portion, and since high temperatures must be avoided or a very dark and bitter oil is obtained.

This invention has among its objects the processing of avocados or similar plant elements in such manner that the oil can be recovered by the usual methods, such as mechanical or solvent extraction, without dehydrating the plant elements, and in such manner that a cold processed oil, free of excessive coloring matter and disagreeable taste, is obtained.

I have found that when undried avocados are treated with certain chemical agents, a chemical reaction takes place between the chemical agent and the pectic substance of the cell walls which causes the cell wall structure to disintegrate and the oil-water emulsion within the cells to break. Substantially all the oil contained in the disintegrated mass can then be recovered by the usual methods of extraction, such as compressing, flotation, centrifuging, and solvent extraction, or by a combination of two or more of these methods. This process thereby eliminating the prior art practice of dehydrating plant materials of this nature prior to extraction of the oil.

As an example of the process applied to avocados, the flesh of the undried fruit is ground to a homogenous paste, and is then mixed intimately with one-half percent to three percent of calcium oxide (unslacked lime) depending on the variety of fruit used, although some excess of the unslacked lime may be employed. The mixture is allowed to stand 15 minutes to 30 minutes if a green oil is desired, or one hour or more if a yellow oil is desired. The oil is then separated by pressing the mixture in a filter press, by flotation with water, by centrifuging it, or by mechanically mixing it with a solvent for the oil, such as petroleum ether or benzene, and recovering the oil from the solvent.

Although the above examples employ unslacked lime, which is preferred because it is cheap, readily available, reacts quickly at room temperature, and has a bodying effect on the pulp which is a distinct mechanical aid when the oil is extracted by pressing, I have found that other chemical agents selected from the class consisting of the hydroxides of calcium, magnesium, sodium and potassium, and the halides of calcium, magnesium, zinc and aluminum may be used.

The proportions of the chemical agents used depend in part on their ability to react with the protopectin of the cell walls to cause disintegration and in part on their physical bodying effect. Too small a quantity of the chemical agent will result in an incomplete disintegration of the cell walls, whereas some excess will result, especially in the case of unslacked lime, in a firmer pulp which handles better in the press.

Having thus described the invention, what is claimed is:

1. A process of extracting oil from avocados comprising forming a pulpy mixture of the avocados with a chemical agent selected from the class consisting of the hydroxides of calcium, magnesium, sodium and potassium and the halides of calcium, magnesium, zinc and aluminum to disintegrate the cell walls of the plant elements and to cause the oil-water emulsion to break, and then separating the oil from the mixture.

2. A process of extracting oil from avocados comprising forming a pulpy mixture of the avocados with lime, to disintegrate the cell walls of the avocados and to cause the oil-water emulsion to break, and then separating the oil from the mixture.

3. A process of extracting oil from avocados comprising forming a pulpy mixture of the avocados with unslacked lime, to disintegrate the cell walls of the avocados and to cause the oil-water emulsion to break, and then separating the oil from the mixture.

4. A process of extracting oil from avocados comprising forming a pulpy mixture of the avocados with unslacked lime, to disintegrate the cell walls of the avocados and to cause the oil-water emulsion to break, and then pressing the mixture to separate the oil therefrom.

HOWARD T. LOVE.